(12) United States Patent
Colam et al.

(10) Patent No.: US 12,187,018 B2
(45) Date of Patent: *Jan. 7, 2025

(54) SOUND-ABSORBING ARTICLE WITH PERFORATIONS IN BACKING, SURFACE COVERINGS COMPRISING SAME, AND SYSTEMS AND METHODS OF MAKING AND USING SAME

(71) Applicant: Columbia Insurance Company, Omaha, NE (US)

(72) Inventors: Stuart Colam, Henley on Thames (GB); Barrett Randolph Morton, Cartersville, GA (US); Andrew Robert Morelli, Woodstock, GA (US); Jay Peter Vecsey, Canton, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,505

(22) Filed: Aug. 22, 2023

(65) Prior Publication Data

US 2023/0391043 A1    Dec. 7, 2023

Related U.S. Application Data

(63) Continuation of application No. 17/553,231, filed on Dec. 16, 2021, now Pat. No. 11,780,204.
(Continued)

(51) Int. Cl.
B32B 3/26 (2006.01)
B32B 5/02 (2006.01)
(Continued)

(52) U.S. Cl.
CPC .............. *B32B 3/266* (2013.01); *B32B 5/022* (2013.01); *B32B 5/024* (2013.01); *B32B 27/12* (2013.01);
(Continued)

(58) Field of Classification Search
CPC ......... B32B 3/266; B32B 5/022; B32B 5/024; B32B 27/12; B32B 27/32; B32B 27/34;
(Continued)

(56) References Cited

U.S. PATENT DOCUMENTS 4,150,186 A * 4/1979 Kazama ................. B32B 37/00
296/210
6,488,801 B1 * 12/2002 Bodaghi ................ D04H 3/007
156/181
(Continued)

*Primary Examiner* — Forrest M Phillips
(74) *Attorney, Agent, or Firm* — Ballard Spahr LLP

(57) ABSTRACT

A sound-absorbing article (e.g., a tufted sound-absorbing article) can comprise a backing having a thickness and a plurality of face fibers associated with the backing. Optionally, the face fibers can comprise a plurality of tufts extending through the backing. The backing can define a plurality of perforations that fully extend through the thickness of the backing and are provided in a pattern to determine an acoustic property of the sound-absorbing article. Within at least a portion of the backing, sequential perforations within the pattern of the plurality of perforations can be spaced center-to-center by between 5 mm and 100 mm.

28 Claims, 7 Drawing Sheets

Related U.S. Application Data

(60) Provisional application No. 63/126,102, filed on Dec. 16, 2020.

(51) Int. Cl.
| | |
|---|---|
| *B32B 27/12* | (2006.01) |
| *B32B 27/32* | (2006.01) |
| *B32B 27/34* | (2006.01) |
| *B32B 27/36* | (2006.01) |
| *B32B 38/04* | (2006.01) |
| *G10K 11/168* | (2006.01) |

(52) U.S. Cl.
CPC ............. *B32B 27/32* (2013.01); *B32B 27/34* (2013.01); *B32B 27/36* (2013.01); *B32B 38/04* (2013.01); *G10K 11/168* (2013.01); *B32B 2038/047* (2013.01); *B32B 2250/02* (2013.01); *B32B 2307/10* (2013.01); *B32B 2471/00* (2013.01)

(58) Field of Classification Search
CPC ... B32B 27/36; B32B 38/04; B32B 2038/047; B32B 2250/02; B32B 2307/10; B32B 2471/00; G10K 11/168
See application file for complete search history.

(56) References Cited

U.S. PATENT DOCUMENTS

| | | | |
|---|---|---|---|
| 11,780,204 B2* | 10/2023 | Colam | B32B 5/022 |
| | | | 181/290 |
| 2019/0299577 A1* | 10/2019 | Hill | B32B 3/30 |
| 2022/0153210 A1* | 5/2022 | Daniszewski | B32B 15/046 |

* cited by examiner

SOUND-ABSORBING ARTICLE WITH PERFORATIONS IN BACKING, SURFACE COVERINGS COMPRISING SAME, AND SYSTEMS AND METHODS OF MAKING AND USING SAME

CROSS-REFERENCE TO RELATED APPLICATION

The application is a continuation of U.S. patent application Ser. No. 17/553,231, filed Dec. 16, 2021, which claims priority to and the benefit of the filing date of U.S. Provisional Application No. 63/126,102, filed Dec. 16, 2020, the entirety of which is hereby incorporated by reference herein.

FIELD

The disclosure relates to sound-absorbing articles (e.g., sound-absorbing carpet products) and, in particular, to tufted sound-absorbing articles having a backing that defines a plurality of perforations that affect an acoustic property of the tufted sound-absorbing article. The disclosed sound-absorbing articles can be installed together to define at least a portion of a surface covering, such as, for example, a floor covering.

BACKGROUND

Conventional tufted articles, such as carpet, do not offer sufficient sound absorption for all purposes. Typical carpet tiles exhibit reasonable sound absorption at relatively high frequencies. Some carpets are provided with an underlay that absorbs lower frequencies (e.g., at and below about 500 Hz). However, conventional tufted articles, both with and without underlays, fail to provide appreciable sound absorption across the audible spectrum (e.g., particularly, in the 1 kHz and 2 kHz octave bands). Accordingly, acoustic designers, when selecting flooring, conventionally have to choose between tile, which absorbs relatively little sound, and carpet that produces higher sound absorption, but across an insufficient frequency spectrum.

SUMMARY

Described herein, in various aspects, is a sound-absorbing article (e.g., a tufted sound-absorbing article) comprising a backing having a thickness and a plurality of face fibers associated with the backing. Optionally, the face fibers can comprise a plurality of tufts extending through the backing. The backing can define a plurality of perforations that fully extend through the thickness of the backing and are provided in a pattern to determine an acoustic property of the sound-absorbing article. Within at least a portion of the backing, sequential perforations within the pattern of the plurality of perforations can be spaced center-to-center by between 5 mm and 100 mm.

In some aspects, a system can comprise a sound-absorbing article as disclosed herein and a porous underlay material.

In another aspect, a method can comprise forming, in an article comprising a backing having a thickness and a plurality of face fibers associated with the backing, a plurality of perforations that fully extend through the thickness of the backing.

The plurality of perforations can be patterned to determine an acoustic property of the sound-absorbing article. Within at least a portion of the backing, sequential perforations within the pattern of the plurality of perforations can be spaced center-to-center by between 5 mm and 100 mm.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DESCRIPTION OF THE DRAWINGS

These and other features of the preferred embodiments of the invention will become more apparent in the detailed description in which reference is made to the appended drawings wherein.

DETAILED DESCRIPTION

Figure 1:
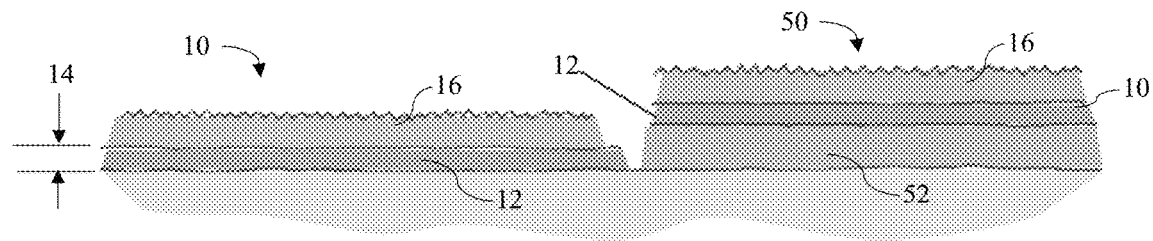
FIG. 1 is a side view of a sound-absorbing article as disclosed herein as well as a system comprising a sound-absorbing article and an underlay.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, use of the term "a perforation" can refer to one or more of such perforations, and so forth.

All technical and scientific terms used herein have the same meaning as commonly understood to one of ordinary skill in the art to which this invention belongs unless clearly indicated otherwise.

As used herein, the terms "optional" or "optionally" mean that the subsequently described event or circumstance may or may not occur, and that the description includes instances where said event or circumstance occurs and instances where it does not.

As used herein, the term "at least one of" is intended to be synonymous with "one or more of." For example, "at least one of A, B and C" explicitly includes only A, only B, only C, and combinations of each.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values or characteristics are approximated by use of the antecedents "about," "substantially," or "generally," it is contemplated that values within up to 15%, up to 10%, up to 5%, or up to 1% (above or below) of the particularly stated value can be included within the scope of those aspects.

The word "or" as used herein means any one member of a particular list and, except when the context indicates otherwise, can also include any combination of members of that list.

As used herein, except where otherwise indicated, it is understood that embodiments described or claimed using "comprise," "comprises," or "comprising" can alternatively be described or claimed using "consisting essentially of" or "consisting of" or equivalent terms.

The term "backing" as used herein includes both primary backing materials and secondary backing materials. Accordingly, the term "backing" can include primary backing materials and/or secondary backing materials. The term "backing" refers to any conventional backing material that can be applied to a tufted product, such as a woven, a non-woven, a knitted, a needle punched fabric, as well as a stitch bonded primary backing material. As one skilled in the art will appreciate, materials such as polypropylene, polyesters, hemp, composites, blend, nylons, or cottons can be used to form the backing material.

The term "fiber" as used herein includes fibers of extreme or indefinite length (i.e. filaments) and fibers of short length (i.e., staple fibers).

The term "yarn" as used herein refers to a continuous strand or bundle of fibers. Such yarns can include, for example and without limitation, monofilament yarns, cut yarns, looped yarns, fibrillated yarns, multifilament yarns, twisted yarns, wrapped yarns, and the like. Optionally, yarns can be textured. The yarns can optionally be textured using conventional methods.

It is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

The following description supplies specific details in order to provide a thorough understanding. Nevertheless, the skilled artisan would understand that the apparatus, system, and associated methods of using the apparatus can be implemented and used without employing these specific details. Indeed, the apparatus, system, and associated methods can be placed into practice by modifying the illustrated apparatus, system, and associated methods and can be used in conjunction with any other apparatus and techniques conventionally used in the industry.

Figure 2:
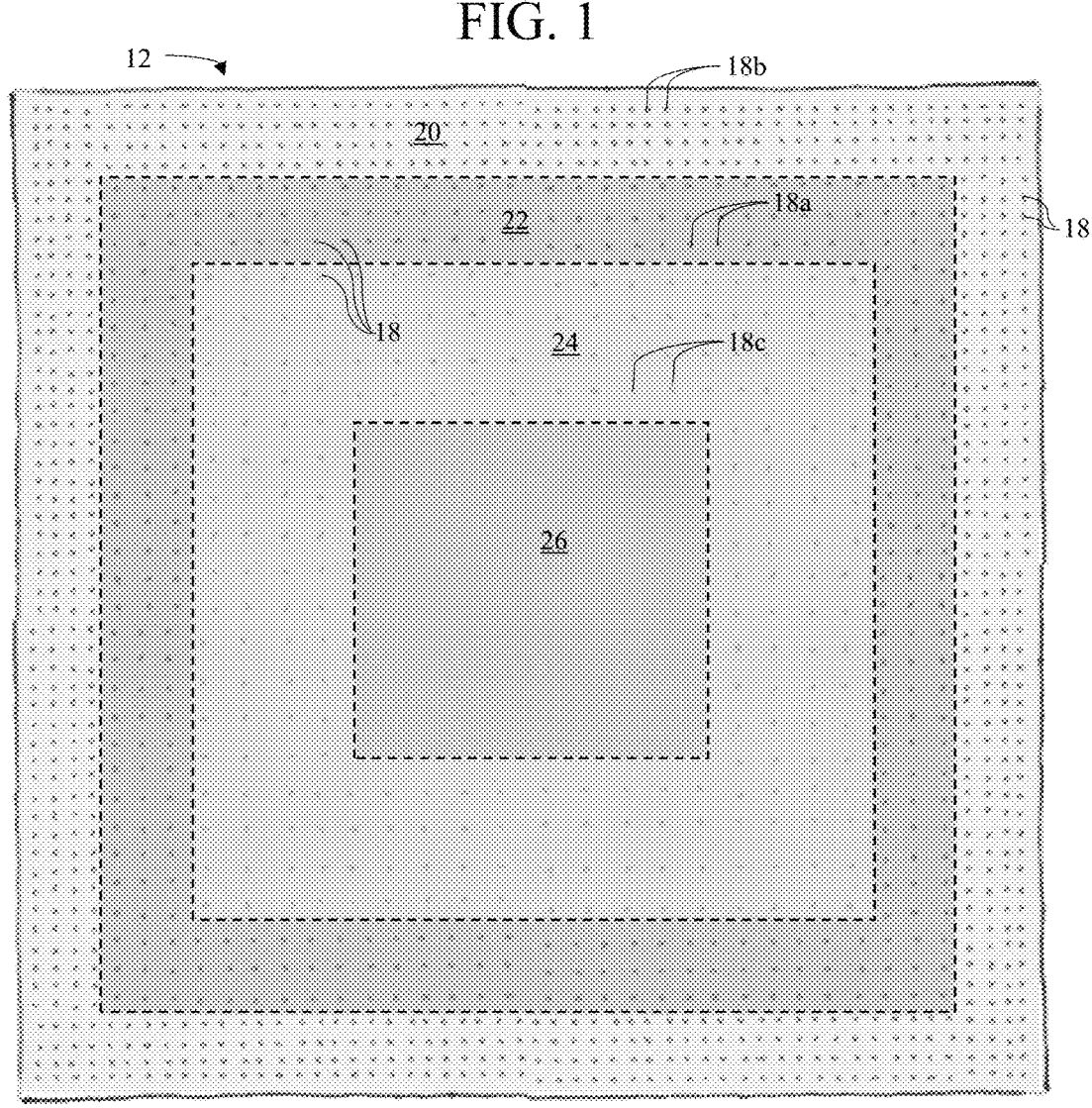
FIG. 2 is a top view of an exemplary backing of a sound-absorbing article illustrating an exemplary pattern for a plurality of perforations that extend through the backing.

Disclosed herein, in various aspects and with reference to FIGS. 1-2, is a sound-absorbing article 10 (e.g., a tufted article, such as a carpet or carpet tile) comprising a backing 12 having a thickness 14. As further disclosed herein, at least one sound-absorbing article can cooperate with other articles to form a surface covering (e.g., a floor covering).

In exemplary aspects, the backing 12 of the sound-absorbing article 10 can have a top (or outer) surface. It is contemplated that the backing 12 can have a structure that is suitable for supporting a particular sound-absorbing article (e.g., the sound absorbing article 10) as described further herein. In exemplary aspects, the backing 12 can comprise a single layer of backing material. Alternatively, in other exemplary aspects, the backing 12 can comprise a plurality of layers, such as, for example and without limitation, a primary backing layer and at least one secondary backing layer (optionally, a plurality of secondary backing layers), which can be coupled to the primary backing layer through an adhesive or intermediate layer. Optionally, in some aspects, the backing 12 can be a woven backing. Optionally, in other aspects, the backing 12 can be a non-woven backing. Optionally, in some aspects, the backing 12 can be permeable to liquid. Optionally, in other aspects, the backing 12 can be impermeable to liquid. Optionally, the backing 12 can comprise at least one coating or film configured to increase durability of the sound-absorbing article. Exemplary coatings or films can comprise polyurethane, which optionally can include fillers that are configured to increase durability of the sound-absorbing article. In further exemplary aspects, the coating or film can comprise a laminated film. Optionally, the coating or film can comprise a layer of extruded polyethylene. In other optional aspects, it is contemplated that the coating or film can comprise a hot melt or powder coating comprising polymeric compounds. In further optional aspects, it is contemplated that the coating or film can comprise a UV-curable coating, such as an ink, glue, adhesive, film, or combinations thereof. In exemplary applications, it is contemplated that such coatings or films can be suitable for reinforcing portions of the sound-absorbing article.

In aspects where the backing 12 comprises a primary backing, the primary backing can comprise a polyolefin, a polyester, a polyamide, or a combination thereof. In such aspects, the primary backing can be woven or non-woven. In certain aspects, the primary backing can comprise non-woven webs, or spunbonded materials. In some aspects, the primary backing can comprise a combination of woven and non-woven materials. In some aspects, the primary backing comprises a polyolefin polymer. In other aspects, the polyolefin polymer comprises polypropylene. In yet other aspects, the primary backing is a slit film polypropylene sheet, such as that sold by Propex or Synthetic Industries owned by Shaw Industries. In yet further aspects, the primary backing can comprise polyester. In a still further aspect, the primary backing can comprise polyamide. In yet further aspects, the primary backing can comprise a combination of polyamide and polyester. In certain aspects, the polyamide is nylon. In some other aspects, the primary backing can comprise a woven polyethylene terephthalate (PET). In yet other aspects, the primary backing can comprise a woven PET having a post-consumer and/or a post-industrial content.

In certain aspects, the primary backing can be a spun-bond primary backing. In some aspects, the spun-bond primary backing component can comprise a bi-component filament of a sheath-core type. In some aspects, the polymeric core component can have a higher melting point than the polymeric sheath component. In some aspects, the polymeric core component can comprise polyester, aliphatic polyamides, polyphenylene oxide and/or co-polymers or blends thereof. In yet other aspects, the polyester can comprise polyethylene terephthalate, polybutylene terephthalate, or polyparaphenylene terephthalamide. In yet other aspects, the polymeric core comprises polyethylene terephthalate. In further aspects, the sheath polymer can comprise a polyamide, polyethylene, or polyester. In yet further aspects, the sheath polymer comprises nylon. In still further aspects, the sheath-core primary backing component comprises polyester as a core component and nylon as a sheath component. The exemplary sheath-core primary backing is commercially available from Low and Bonar of London, United Kingdom. In yet other aspects, an exemplary polyester non-woven primary backing is commercially available from Freudenberg of Weinheim, Germany. In some aspects, it is contemplated that the primary backing can provide extra stability to the sound absorbing article 10.

When provided, it is contemplated a secondary backing can be attached to the primary backing by any methods known in the art, including, for example, through coating, lamination, extrusion, and the like. In certain aspects, the secondary backing can comprise various layers and coatings. Such exemplary backings can comprise extruded polymer sheets, laminated films, calendared hot melts and glues, latex, cross-linked polyurethanes, woven layer(s), meshes and scrims, or any combination thereof. In still further aspects, the secondary backing can comprise a film that can be laminated to the back side of the nonwoven backing layer to thermo-bond the turf fibers to themselves.

Face fibers 16 can be secured to or otherwise associated with the backing 12. Optionally, the face fibers 16 can be secured to or otherwise associated with the backing 12 using conventional methods. In various aspects, it is contemplated that at least a portion of the face fibers 16 (optionally, all the face fibers) can be provided as yarn(s). Optionally, the face fibers 16 can comprise a combination of fibers and yarns. Optionally, in exemplary aspects, the face fibers 16 can comprise a plurality of tufts that are formed using conventional tufting methods (such as, for example, a tufting machine having a needle bar as is known in the art). In these aspects, it is contemplated that the plurality of tufts can extend through the backing 12 and project upwardly from the backing, thereby forming a tufted article. In other aspects, it is contemplated that the face fibers 16 can be woven (for example, through the interweaving of warp and weft yarns). In other aspects, it is contemplated that the face fibers 16 can be knitted or provided in a woven interlock. In other aspects, it is contemplated that the face fibers 16 can be needlepunched. In still other aspects, it is contemplated that the face fibers 16 can be fusion bonded.

In one aspect, the face fibers 16 can comprise cut yarns (e.g., cut tufts). Additionally, or alternatively, the face fibers 16 can comprise loop yarns (e.g., loop tufts). Additionally, or alternatively, the face fibers 16 can comprise monofilament fibers. Additionally, or alternatively, the face fibers 16 can comprise slit films. Additionally, or alternatively, the face fibers 16 can comprise thatch yarns. More generally, it is contemplated that the face fibers can comprise any type of yarn or fiber or any combination of multiple types of yarns or fibers.

The face fibers can comprise any material that is conventionally used in carpet manufacturing, singly or in a combination with other such materials. For example, and without limitation, the face fibers can be synthetic, such as, for example, a material comprising one or more of a conventional nylon, polyester, polypropylene (PP), polyethylene (PE), polyurethane (PU), polyvinyl chloride (PVC), polyethylene terephthalate (PET), polypropylene terephthalate (PPT), polybutylene terephthalate (PBT), polytrimethylene terephthalate (PTT), or any combination thereof. It is contemplated that the conventional nylon of the face fibers can be, for example and without limitation, nylon 6/6, nylon 6, nylon nylon 10/10, nylon 10/11, nylon 11, and the like. In still further aspects, the face fibers can comprise polymeric fibers comprising at least one of nylon, polyester, polyethylene, or polypropylene. Additionally or alternatively, in other aspects, the face fibers can comprise natural fibers, such as cotton, wool, or jute. In some exemplary aspects, the face fibers can comprise one or more biodegradable materials, including, for example, and without limitation, polylactic acid (PLA). In still further aspects, the face fibers can comprise a combination of any of the materials mentioned above.

In further aspects, it is contemplated that the face fibers 16 can be omitted. That is, sound absorption is not entirely dependent on the face fibers, and, in some aspects, surface coverings without face fibers can advantageously incorporate perforations as disclosed herein to improve sound absorption properties.

In exemplary aspects, the backing can have a thickness from about 1 mm to about mm (e.g., from about 1.5 mm to about 3 mm). Exemplary thicknesses of the backing can include about 1.5 mm, about 1.75 mm, about 2 mm, about 2.25 m, about 2.5 mm, about 2.75 mm, or about 3 mm.

Figure 4:
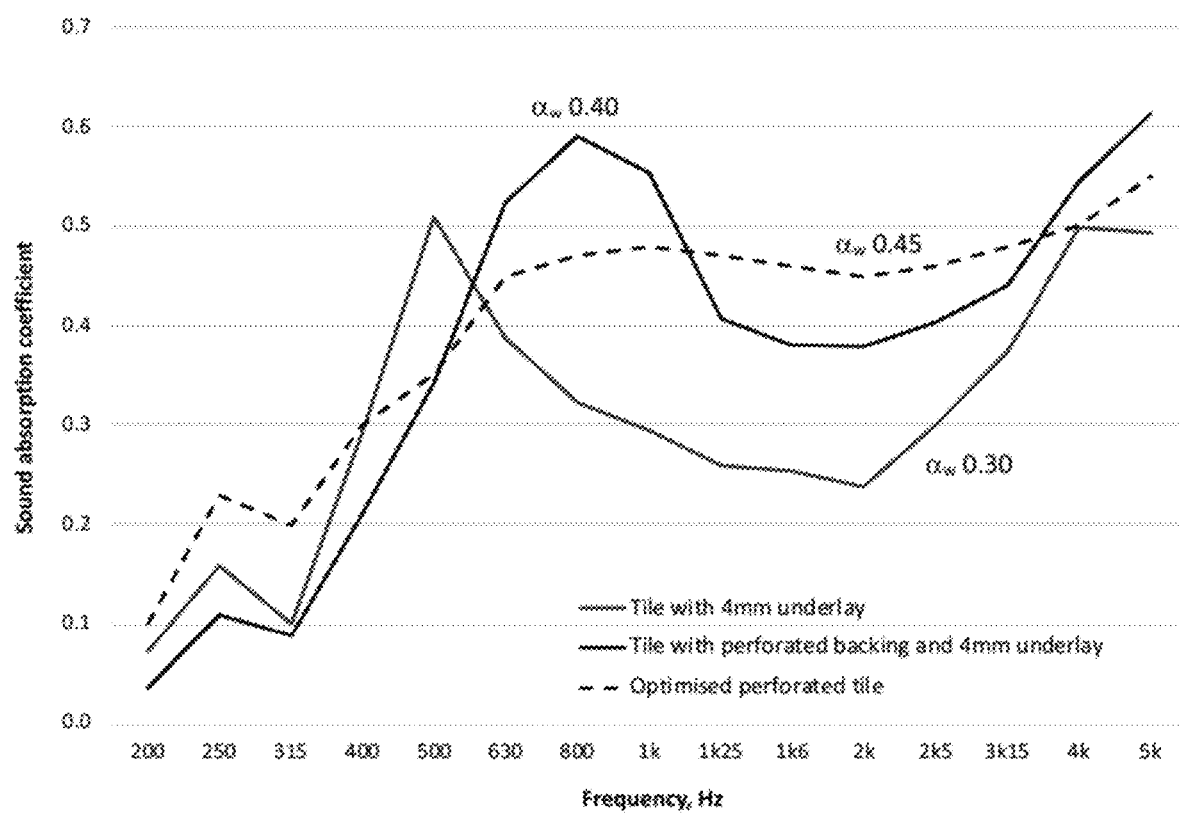
FIG. 4 is a plot showing sound absorption coefficients at various frequencies for a sound-absorbing article having perforations as well as an exemplary optimized absorption coefficient curve.

The backing 12 can define a plurality of perforations 18 that extend entirely through the thickness 14 of the backing 12. In further exemplary embodiments, the perforations 18 can extend at least partially through the thickness 14 of the backing 12. In still further exemplary embodiments, at least some (optionally, all of) the perforations 18 can extend only partially through the thickness 14 of the backing 12. The plurality of perforations 18 extending through the backing 12 can be provided in a pattern to cause the sound-absorbing article 10 (or a surface covering formed at least partially by one or more sound-absorbing articles 10) to have a select acoustic property (or a combination of select acoustic properties). In various aspects, the select acoustic property can comprise an acoustic (sound) absorption coefficient at a particular frequency or across a range of frequencies. FIG. 4 illustrates plots of sound absorption coefficients for different assemblies (a carpet tile with a 4 mm underlay, a carpet tile with a perforated backing and a 4 mm underlay, and a carpet tile with a perforated backing) across different frequencies. It is contemplated that a sound absorption coefficient can be calculated as a ratio of sound energy incident on a surface to sound energy reflected. In some aspects, the select acoustic property of the article 10 (or the surface covering comprising at least one article 10) can be, at least in part, a function of the size and/or shape of the perforations. Accordingly, in some aspects, the pattern can be at least partially defined by the size(s) and shape(s) of the perforations 18 in the backing.

Within at least a portion of the backing, sequential perforations of the plurality of perforations 18 can be spaced center-to-center by between 5 mm and 100 mm. That is, adjacent or sequential perforations can be spaced center-to-center by between 5 mm and 100 mm. Optionally, the adjacent or sequential perforations can be equally spaced or unequally spaced. It is contemplated that, in various aspects, the plurality of perforations can be arranged so that, within at least a portion of the backing, the average center-to-center spacing between sequential perforations is between 5 mm and 100 mm. In still further aspects, the center-to-center spacing can be from about 5 mm to about 50 mm or from about 5 mm to about 30 mm. As used herein to describe the relationship between multiple perforations, the terms "adjacent" and "sequential" indicate that two perforations are spaced apart but arranged so that the two perforations are sequentially positioned within a row, column, or other element of the pattern (such that a line can be drawn between the two perforations without intersecting another perforation).

In various optional aspects, it is contemplated that optimal absorption properties can be achieved when the plurality of perforations 18 each have a diameter of between 0.5 mm and 2.5 mm. Optionally, the plurality of perforations 18 can each have a diameter of about 1 mm. However, other diameters are contemplated.

In some optional aspects, the sound-absorbing article 10 can comprise a first plurality of perforations 18a and a second plurality of perforations 18b. The first plurality of perforations 18a can be arranged in a first pattern, and the second plurality of perforations 18b can be arranged in a second pattern that is different from the first pattern (for example, in shape of the pattern of perforations, number of perforations, spacing of perforations, size of perforations, shape of perforations, concentration of perforations, surface area of perforations, or combinations thereof). In still further optional aspects, it is contemplated that the sound-absorbing article 10 can comprise a third plurality of perforations 18c. The third plurality of perforations 18c can be arranged in a third pattern that is different from the first pattern of the first plurality of perforations 18a and the second pattern of the second plurality of perforations 18b. In yet further optional aspects, the sound-absorbing article 10 can comprise an area 26 that is devoid of perforations. In some embodiments such an area 26 that is devoid of perforations 18 may be absent from the sound-absorbing article 10. That is, in some example embodiments, the area 26 devoid of perforations 18 can be optional. Each separate pattern (e.g., the first pattern, the second pattern, and the third pattern) can be disposed over respective areas. Optionally, the respective areas can be non-overlapping.

It is contemplated that each pattern (e.g., the first pattern, the second pattern, and the third pattern) can optionally be defined, in part or entirely, by a number of perforations over a given area. It is further contemplated that each pattern can optionally be defined, in part or entirely, by the percentage of the total surface area within the given area that is occupied by perforations, referred to herein as "percent open area." Accordingly, in a given area of one square centimeter that includes five perforations each having a surface area of one square millimeter, the total surface area of the five perforations is five square millimeters, which represents a percent open area of 5%. In exemplary aspects, one or more of the patterns can comprise a grid of perforations with rows and/or columns that cooperate to define a square. In some optional aspects, at least one of the first pattern, the second pattern, or the third pattern can comprise a grid with rows and/or columns that cooperate to define another shape, such as, for example and without limitation, a rectangle, a triangle, trapezoid, pentagon, hexagon, and the like. Optionally, the grids that define the patterns can include rows and columns that are perpendicular to one another. Additionally, or alternatively, it is contemplated that the rows and columns can be positioned at an oblique angle relative to one another. Additionally, or alternatively, it is contemplated that the patterns can comprise a plurality of rows, with adjacent or sequential rows including perforations that are axially offset from or out of alignment with one another to provide a staggered arrangement of perforations. In further optional aspects, one or more of the patterns can be irregular (e.g., random or apparently random), having inconsistent spacing between sequential perforations. Thus, in some aspects, a pattern (and an area associated therewith) can have an uneven distribution of perforations.

It is contemplated that different patterns of perforations (or the given areas containing the different patterns) can be positioned adjacent to or in sequence with each other. Different patterns adjacently positioned can advantageously create edge effects in which discontinuities provide additional sound absorption/cancellation. It is further contemplated that edge effects can be maximized by adjacently positioning patterns with the greatest difference in sound absorption at a given frequency, as further described herein. In some aspects, a single article can comprise a plurality of areas (e.g., adjacent areas), each having a respective pattern of perforations. In further aspects, each article can have a respective single pattern of perforation (or lack of perforations), and a plurality of such articles can be arranged as a surface covering (e.g., a floor covering) so that the respective patterns of adjacent articles provide edge effects.

The outer boundaries of a pattern of perforations can define a given area. In some aspects, and with reference to FIG. 2, the first pattern can be disposed over a first area 22, and the second pattern can be disposed over a second area 20. In some aspects, the first area 22 can contact or share a boundary with the second area 20. Optionally, the second area 20 can have an inner boundary that defines a perimeter, and the first area 22 can be disposed within the perimeter defined by the second area 20 so that the second area 22 encloses (encircles/circumscribes) the first area 22. Optionally, in further aspects, a third pattern can be disposed over a third area 24. In still further aspects, the third area 24 can contact or share a boundary with one or both of the first area 22 or the second area 20. Optionally, in these aspects, and as shown in FIG. 2, the third area 24 can be disposed within a perimeter defined by an inner boundary of the first area 22 so that the first area 22 encircles the third area 24. Alternatively, in further aspects (not shown), the third area 24 can have an inner boundary that defines a perimeter within which the first and second areas 22, 20 are disposed so that the third area 24 encircles the first and second areas 22, 20.

In exemplary aspects, the areas (e.g., the first, second, third areas 22, 20, 24, and the area devoid of perforations) can be rectangular (e.g., optionally, square), wherein said areas are defined by the respective patterns of perforations therein (or, in the case of the area devoid of perforations, defined by outer boundaries of surrounding pattern(s) of perforations). In further aspects, the areas can be hollow rectangles. In yet further aspects, the areas can be round (e.g., circular or annular). In yet further aspects, the areas can be triangular (e.g., right triangles or equilateral triangles) and can optionally be hollow areas. In still further aspects, different areas of the same article can have different shapes, such as for example, any combination of one or more rectangles, hollow rectangles, triangles, hollow triangles, circles, annuluses, or amorphous shapes.

Although shown and described as having first, second, and third areas, each having a respective pattern, it is contemplated that various embodiments can comprise only a single area having a single pattern, two different patterns, three different patterns, or more. In further aspects, it is contemplated that the disclosed backings 12 can include four or more areas having respective patterns of perforations. For example, referring to FIG. 7, the backing can comprise a fourth area 25. Although shown in FIG. 7 as an area disposed in series with respective first, second, third areas 22, 20, 24 and the area 26, in further aspects, the fourth area 25 can be arranged in the encircling pattern illustrated in FIG. 2 (e.g., surrounding the second area 20). In yet further aspects, each distinct area (e.g., first, second, third area) can have two or more patterns distributed within the area.

In some aspects, and with reference to FIG. 2, it is contemplated that, in embodiments having an area 26 that is devoid of perforations, the area 26 that is devoid of perforations can be disposed within a perimeter defined by an inner boundary of the third area 24, which is disposed within a perimeter defined by an inner boundary of the first area 22, which is, in turn, disposed within a perimeter defined by an inner boundary of the second area 20. In further aspects (not shown), the area 26 that is devoid of perforations can have an inner boundary that defines a perimeter within which the first area 22, and optionally the second area 20 and the third area 24, are disposed. Optionally, the area that is devoid of perforations can comprise a contiguous area of at least 1,000 square millimeters, at least 2,000 square millimeters, or at least 2,500 square millimeters, such as, for example a square area of 50 mm by 50 mm or a square area of 100 mm by 100 mm, or a square area of 200 mm by 200 mm. As used in this context, the term "contiguous area" refers to an area in which any line drawn from an outer boundary of the area across a portion of the area and to an opposing location on the outer boundary of the area will not intersect a perforation. Although shown as rectangular (e.g., square), the area 26 that is devoid of perforations can be circular or have any other shape.

It is contemplated that the second pattern can have a percent open area that is greater than the percent open area of the first pattern. It is further contemplated that the third pattern can have a percent open area that is greater than the percent open area of the second pattern. In further aspects, it is contemplated that the second pattern can have a percent open area that is less than the percent open area of the first pattern. It is further contemplated that the third pattern can have a percent open area that is less than the percent open area of the second pattern.

Optionally, one of the first pattern or the second pattern can comprise sequential perforations spaced center-to-center by between 8 mm and 12 mm. Optionally, the other of the first pattern or the second pattern can comprise sequential perforations spaced center-to-center by between 13 mm and 17 mm. Optionally, one of the first pattern or the second pattern can have a percent open area of 0.6% to 0.8%. Optionally, the other of the first pattern or the second pattern can have a percent open area of 0.25% and 0.45%. In some optional aspects, the third pattern can comprise sequential perforations spaced center-to-center by between 15 mm and 25 mm. Optionally, the third pattern can comprise a percent open are of 0.15% to 0.25%. It is contemplated that the spacing of the perforations and the percent open area can be a function of the thickness 14 of the backing 12. Accordingly, the exemplary ranges disclosed herein should be understood to be optional, and routine experimentation can enable one skilled in the art to select the pattern(s) that produce a desired sound absorption. In some aspects, the fourth area 25 (when provided) can have a fourth pattern. In some optional aspects, the fourth pattern can have a percent open area of 0.02% to 0.1% (e.g., 0.04% open area). In various aspects, it is contemplated that the percent open area can be adjusted by adjusting perforation diameter, perforation density (e.g., number of perforations per square area), or both.

Optionally, the first, second, and third areas 22, 20, 24 can be concentrically arranged. Optionally, the first and second (and optionally third or more) areas can be arranged in a first arrangement so that the higher percent open areas are outward of relatively lower percent open areas (as is shown in FIG. 2). In further optional aspects, it is contemplated the first and second (and optionally third or more) areas can be arranged in a second arrangement so that the higher percent open areas are inwardly positioned relative to lower percent open areas. Optionally, it is contemplated that an article can comprise a plurality of alternating first and second arrangements. In this way, the adjacent first and second arrangements define, between each other, a discontinuity between different patterns that provide edge effects, as described herein. It is contemplated that, in providing alternating first and second arrangements, patterns having maximum differences in peak sound absorption (e.g., an area with no percent open area adjacent an area with the highest percent open area) can be disposed adjacently to maximize the sound absorption due to edge effects. In some aspects, a surface covering can comprise a plurality of discrete carpet tiles, wherein each carpet tile includes one arrangement (e.g., a first arrangement or a second arrangement). In further aspects, the surface covering can comprise a continuous article that comprises a plurality of arrangements (e.g., the first arrangement or the second arrangement, or a combination thereof).

Figure 6:
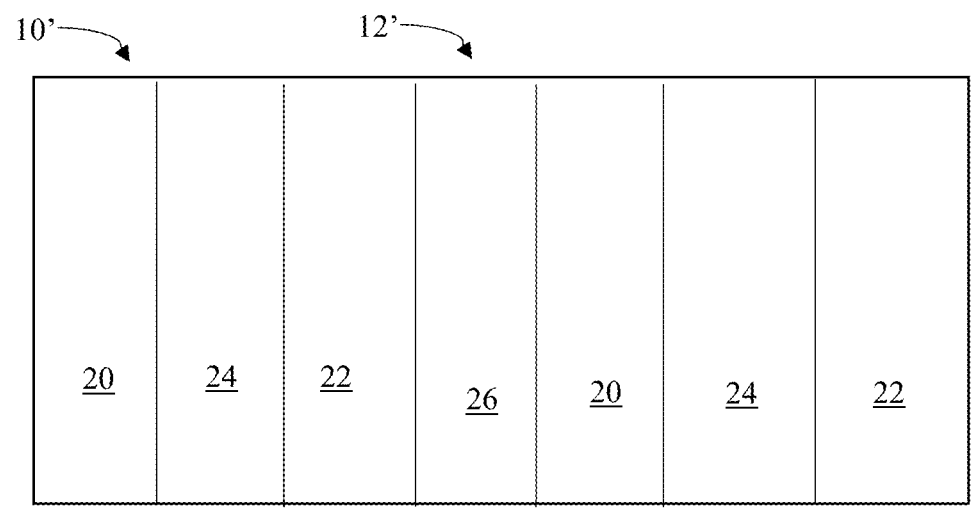
FIG. 6 illustrates another embodiment of a sound-absorbing article as disclosed herein.

Although shown as concentrically oriented areas is the illustrated embodiments, it is contemplated that, in further aspects, the plurality of areas (e.g., the first, second, and third areas 22, 20, 24 as well as the area 26 that is devoid of perforations) can be provided in various other arrangements. For example, referring to FIG. 6, in an exemplary article 10', the plurality of areas can be arranged as longitudinally extending bands (e.g., rectangular bands) that are adjacently and sequentially arranged relative to a transverse axis that is perpendicular to the bands' respective axes of elongation. For example, the article 10' can comprise a backing 12' with one or more of the following: at least one first area 22, at least one second area 20, at least one third area 24, or at least one area 26 that is devoid of perforations 18. It is contemplated that a surface covering 110 as disclosed herein can comprise a plurality of articles 110' that each define a respective area, or one or more articles that comprises a plurality of areas with different perforation patterns (e.g., the first, second, third areas 22, 20, 24 and the area 26 devoid of perforations).

Figure 5:
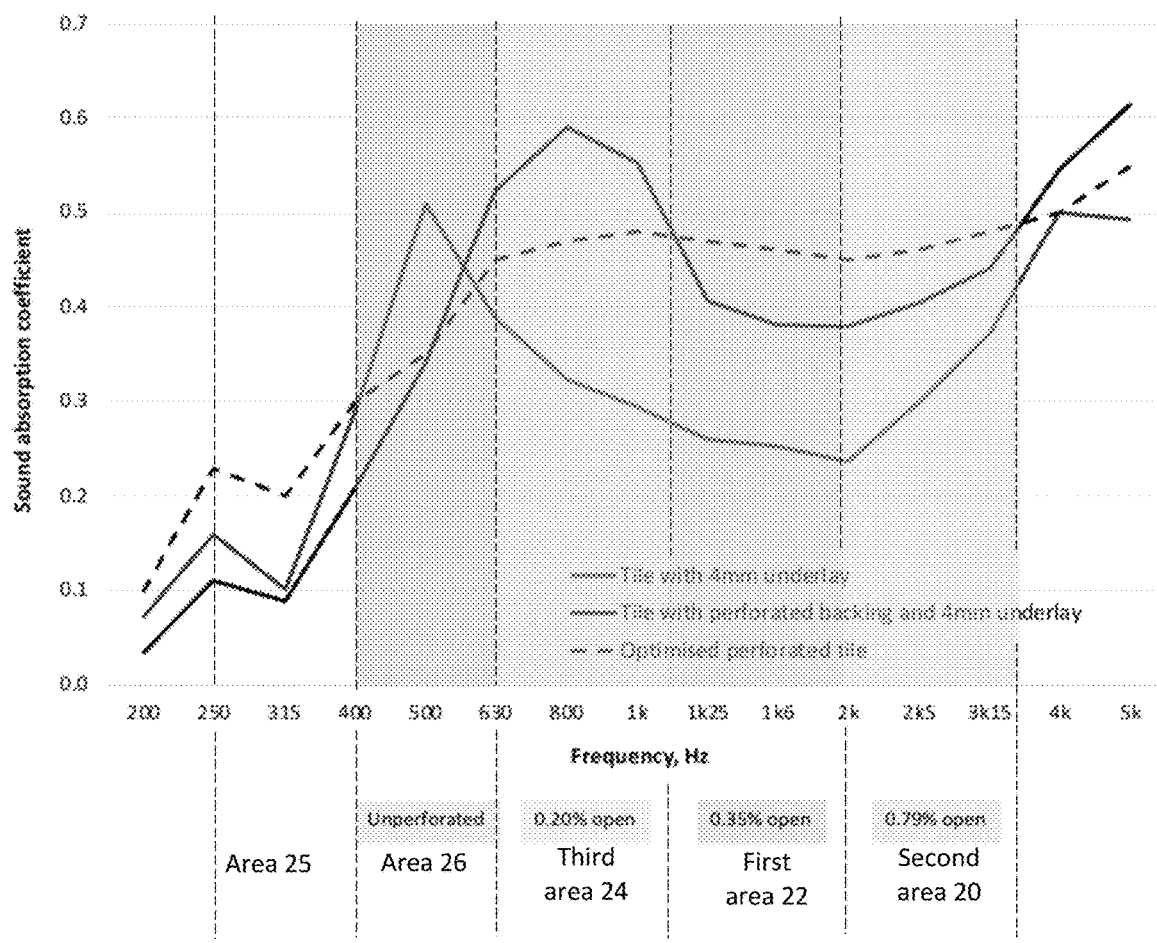
FIG. 5 is the plot of FIG. 4 illustrating frequency ranges in which different perforation patterns provide pronounced sound absorption.

Referring to FIGS. 2 and 5, in some exemplary embodiments, the area 26 devoid of perforations can be configured to define a peak sound absorption between 315 Hz and 500 Hz. As should be understood, peak sound absorption can refer to a frequency at which an area with a particular pattern provides a peak absorption coefficient (e.g., a frequency at which a maximum amplitude of sound is absorbed). In some optional aspects, at least a portion of the plurality of perforations can be configured to define a peak sound absorption between 600 and 1000 Hz (optionally, between 630 Hz and 1000 Hz). For example, in an exemplary embodiment, the third plurality of perforations 18c can have a percent open area of about 0.2% and can cause the third area 24 of the sound-absorbing article 10 to have a peak absorption coefficient at about 800 Hz. In some optional aspects, at least a portion of the plurality of perforations can be configured to define a peak sound absorption between 1 kHz and 1.6 kHz. For example, in an exemplary embodiment, the first plurality of perforations 18a can have a percent open area of about 0.35% and can cause the first area 22 of the sound-absorbing article 10 to have a peak absorption coefficient at about 1.25 kHz. In some optional aspects, at least a portion of the plurality of perforations can be configured to define a peak sound absorption between 1.6 kHz and 2.5 kHz. For example, in an exemplary embodiment, the second plurality of perforations 18b can have a percent open area of about and can cause the second area 20 of the sound-absorbing article 10 to have a peak absorption coefficient at about 2 kHz. In further aspects, a fourth plurality of perforations can have a percent open area of about 0.04% and can have a peak absorption from about 200 Hz to about 315 Hz.

As should be understood, the areas disclosed herein and the patterns of perforations associated therewith can optionally be disposed on a single article. In further aspects, said areas and respective patterns can be provided on multiple articles 10 that are arranged in a surface covering 110 (e.g., a floor covering). For example, each article can define a single respective area having a single pattern of perforations associated therewith. In further aspects, one or more articles can have a plurality of areas having respective patterns of perforations associated therewith, and said articles can be arranged to form surface covering 110. In various aspects, it is contemplated that a surface covering can comprise only a single area having a single perforation pattern, a plurality of areas comprising only two patterns of perforations, only three patterns of perforations, only four patterns of perforations, or five or more patterns of perforations. Across each surface covering, each pattern of perforations can be distributed over one or more areas. For example, multiple discrete areas of a surface covering can comprise the same pattern of perforations. Optionally, the surface covering can comprise one or more areas 26 devoid of perforations. In further aspects, the surface covering does not comprise an area devoid of perforations.

Figure 7A:
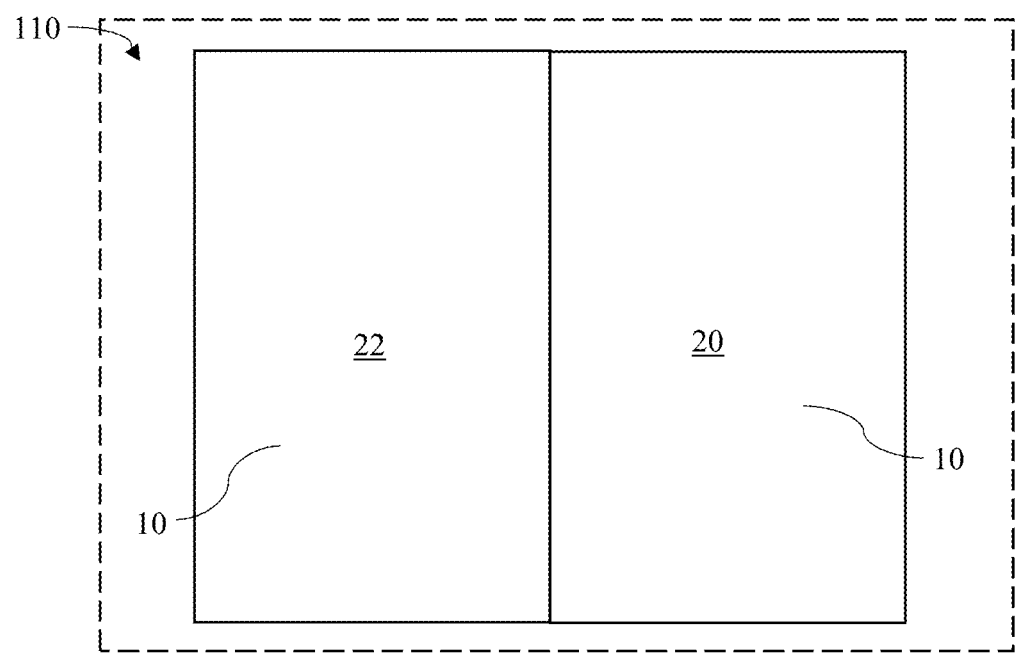
FIG. 7A illustrates an embodiment of a surface covering (e.g., a floor covering) comprising a plurality of sound-absorbing articles as disclosed herein.
Figure 7B:
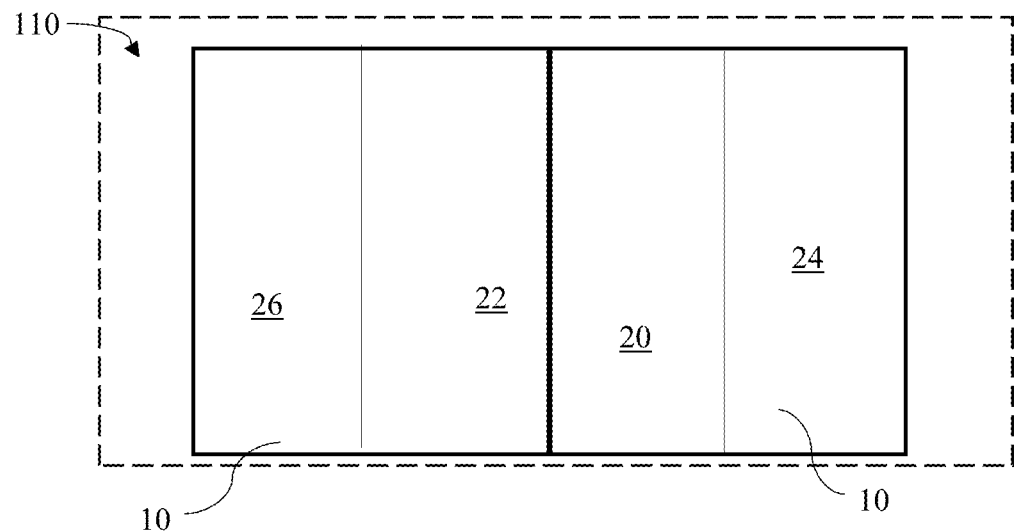
FIG. 7B illustrates another embodiment of a surface covering (e.g., a floor covering) comprising a plurality of sound-absorbing articles as disclosed herein.
Figure 7C:
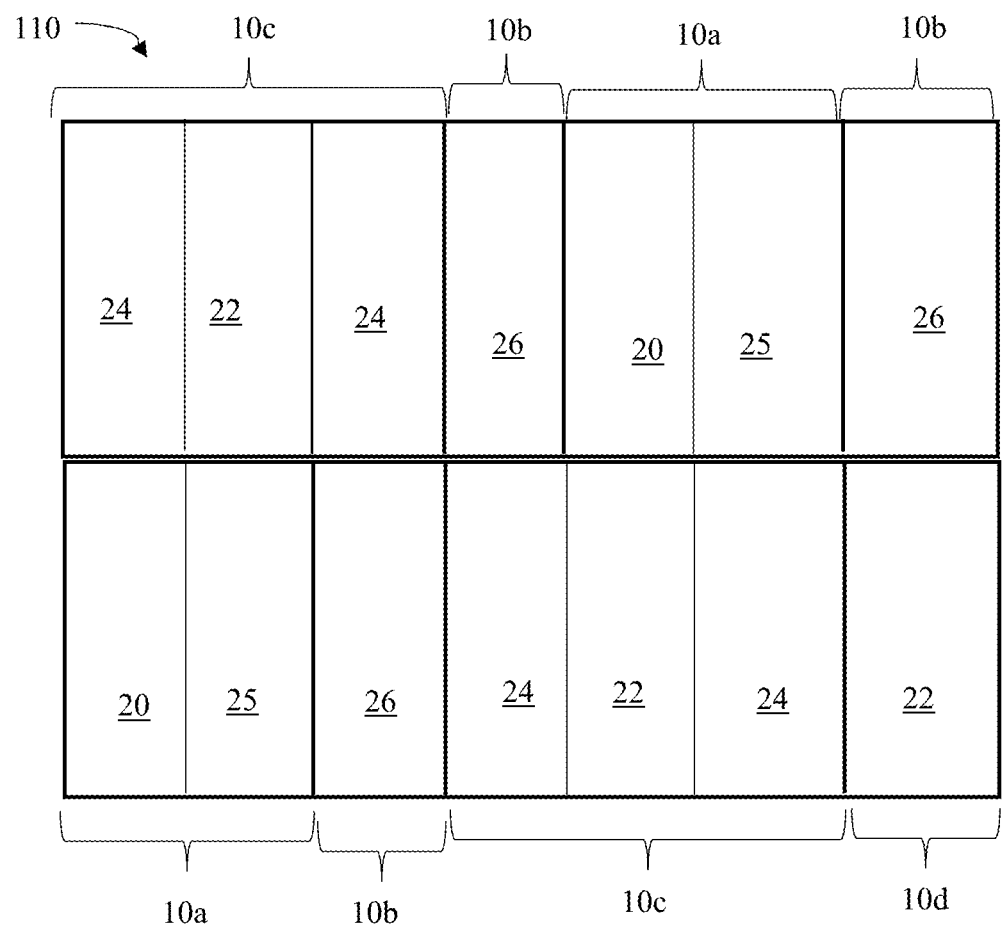
FIG. 7C illustrates yet another embodiment of a surface covering (e.g., a floor covering) comprising a plurality of sound-absorbing articles as disclosed herein.

For example, with reference to FIGS. 7A-7C, it is contemplated that the surface covering 110 can be formed from a plurality of articles, each having one or more areas having respective perforation patterns (including an absence of perforations). Thus, in various aspects, it is contemplated that the various areas disclosed herein (for example, areas 22, 24, 25, 26) can be distributed among a plurality of articles that form a surface covering. Thus, when particular arrangements of respective areas and perforation patterns are disclosed herein, it is contemplated that such arrangements can be achieved either within a single article or within a surface covering (through distribution of said areas and/or patterns among a plurality of articles that form the surface covering).

Referring to FIGS. 7A and 7B, the floor covering 110 can comprise at least one article 10. Optionally, the floor covering 110 can comprise a plurality of articles 10. A first article of the plurality of articles can comprise a first plurality of perforations that are arranged in a first pattern. The first plurality of perforations are disposed over a first area 22. A second article of the plurality of articles can comprise a second plurality of perforations that are arranged in a second pattern. The second plurality of perforations can be disposed over a second area 20. The first pattern can define a first open area, and the second pattern defines a second open area. Optionally, the first open area is greater than the first open area.

In some aspects, the first and second articles 10 can be arranged so that the first area 22 is adjacent to the second area 20.

Referring to FIG. 7A, in some optional aspects, the first article can have a surface area, and the first area 22 can cover an entirety of, or substantially an entirety of, the surface area of the first article. Similarly, in some optional aspects, the second article can have a surface area, and the second area 20 can cover an entirety of the surface area of the second article.

In further aspects and with reference to FIG. 7B, at least one of the first article or the second article comprises a third plurality of perforations that are arranged in a third pattern, wherein the third plurality of perforations are disposed over a third area 24. In some optional aspects, at least one article 10 of the plurality of articles can comprise an area 26 devoid of perforations. The area devoid of perforations can comprises a square area having dimensions of at least 50 mm by at least 50 mm or at least 100 mm by at least 100 mm or at least 200 mm by at least 200 mm.

As another example, and shown in FIG. 7C, a first article 10a can comprise two areas having respective perforation patterns, a second article 10b can have a single area of a given perforation pattern, a third article 10c can have three areas with respective patterns, and a fourth article 10d can have a single area of a given perforation pattern. In exemplary aspects, the third article 10c can have opposed edge portions of a first perforation pattern and a middle portion between the opposed edge portions of a second perforation pattern. Adjacent articles can be positioned next to each other so that the adjacent areas of adjacent articles have different perforation patterns in order to provide edge effects that advantageously provide further sound absorption/cancelation. Although respective areas of the first, second, third, and fourth articles 10a-10d are shown having areas with approximately equal widths, it is contemplated that the widths (and lengths) can be the same or different for each area. Optionally, at least one article (e.g., the second article 10b) of the surface covering 110 can comprise a backing that does not comprise perforations.

It is further contemplated that the plurality of articles can be arranged so that ends (e.g., longitudinal ends and/or transverse sides, as illustrated in FIG. 7C) of the perforation patterns are adjacent to different perforation patterns (for example, on adjacent articles of the surface covering) to generate edge effects as further described herein. For example, for a surface covering 110 comprising only two different perforation patterns, each pattern of the two different perforation patterns disposed over a plurality of different areas, the articles (and areas of patterns associated therewith) can be arranged so that the perforation patterns are in a checkerboard-style alternating arrangement (for example, with the first and second perforation patterns alternating within respective rows and columns). For three or more perforation patterns, each pattern disposed over a plurality of different areas, the articles (and areas of patterns associated therewith) can be arranged to provide optimal edge effects. For example, the articles can be arranged to adjacently positioned areas with the greatest difference in sound absorption at a given frequency.

Optionally, the first pattern (disposed on the first area 22) can comprise sequential perforations spaced center-to-center by between 8 mm and 12 mm. Optionally, the second pattern (disposed on the second area 20) can comprise sequential perforations spaced center-to-center by between 13 mm and 17 mm. Optionally, the first pattern can have a percent open area of 0.6% to 0.8%. Optionally, the second pattern can have a percent open area of and 0.45%. In some optional aspects, the third pattern can comprise sequential perforations spaced center-to-center by between 15 mm and 25 mm. Optionally, the third pattern (disposed over the third area 24) can comprise a percent open are of 0.15% to 0.25%. In some aspects, the fourth area 25 can have a fourth pattern of perforations. In some optional aspects, the fourth pattern of perforations can have a percent open area of 0.02% to (e.g., 0.04% open area). In various aspects, it is contemplated that the percent open area can be adjusted by adjusting perforation diameter, perforation density (e.g., number of perforations per square area), or both. It is contemplated that the spacing of the perforations and the percent open area can be a function of the thickness 14 of the backing 12. Accordingly, the exemplary ranges disclosed herein should be understood to be optional, and routine experimentation can enable one skilled in the art to select the pattern(s) that produce a desired sound absorption.

In some aspects, at least one area (e.g., the areas 26 devoid of perforations) of the surface covering 110 can be configured to define a peak sound absorption between 315 Hz and 500 Hz. In some optional aspects, at least one area (e.g., the third areas 24) can be configured to define a peak sound absorption between 600 and 1000 Hz (optionally, between 630 Hz and 1000 Hz). For example, in an exemplary embodiment, the third areas 24 can have a percent open area of about 0.2% and can cause the third area 24 of the surface covering 110 to have a peak absorption coefficient at about 800 Hz. In some optional aspects, at least one area (e.g., the first areas 22) can be configured to define a peak sound absorption between 1 kHz and 1.6 kHz. For example, in an exemplary embodiment, the first areas 22 can have a percent open area of about 0.35% and can have a peak absorption coefficient at about 1.25 kHz. In some optional aspects, at least one area (the second areas of the can be configured to define a peak sound absorption between 1.6 kHz and 2.5 kHz. For example, in an exemplary embodiment, the second areas 20 can have a percent open area of about 0.79% so that the second areas 20 of the surface covering 110 have a peak absorption coefficient at about 2 kHz. In further aspects, the fourth areas 25, each having a fourth plurality of perforations disposed thereon, can have a percent open area of about and can have a peak absorption from about 200 Hz to about 315 Hz.

In some aspects, the areas having their respective patterns of perforations can cooperate to form a pattern sequence, such as that shown in FIG. 2 with the first, second, and third areas 22, 20, 24 and the area 26 devoid of perforations concentrically arranged (for example, with each area having a common geometric center). In some aspects, the pattern sequence can be defined by a repeating sequence of a plurality of areas having respective patterns of perforations. Optionally, a backing 12 or a surface covering 110 can comprise a pattern sequence that is repeated multiple times. In further aspects, the pattern sequence does not repeat across the backing 12 or the surface covering 110.

In some optional aspects, each area having a respective perforation pattern (e.g., the first, second, third, fourth areas 22, 20, 24, 25, and the area 26 devoid of perforations) can have a length from about 0.5 meters to about 5 meters (e.g., from about 1 meter to about 2 meters, or about 1.4 meters). In some optional aspects, each area having a respective perforation pattern (e.g., the first, second, third, fourth areas 22, 20, 24, 25, and the area 26 devoid of perforations) can have a width from about 0.5 meters to about 5 meters (e.g., from about 1 meter to about 2 meters, or about 1.4 meters). Accordingly, in exemplary aspects, said areas can be square. In further aspects, it is contemplated that said areas can be rectangular. For example, the areas can have a width from about 1 meter to about 2 meters and a length that is greater than the width (for example, a length of 1.5, two, three, four, or more times the width).

Figure 3:
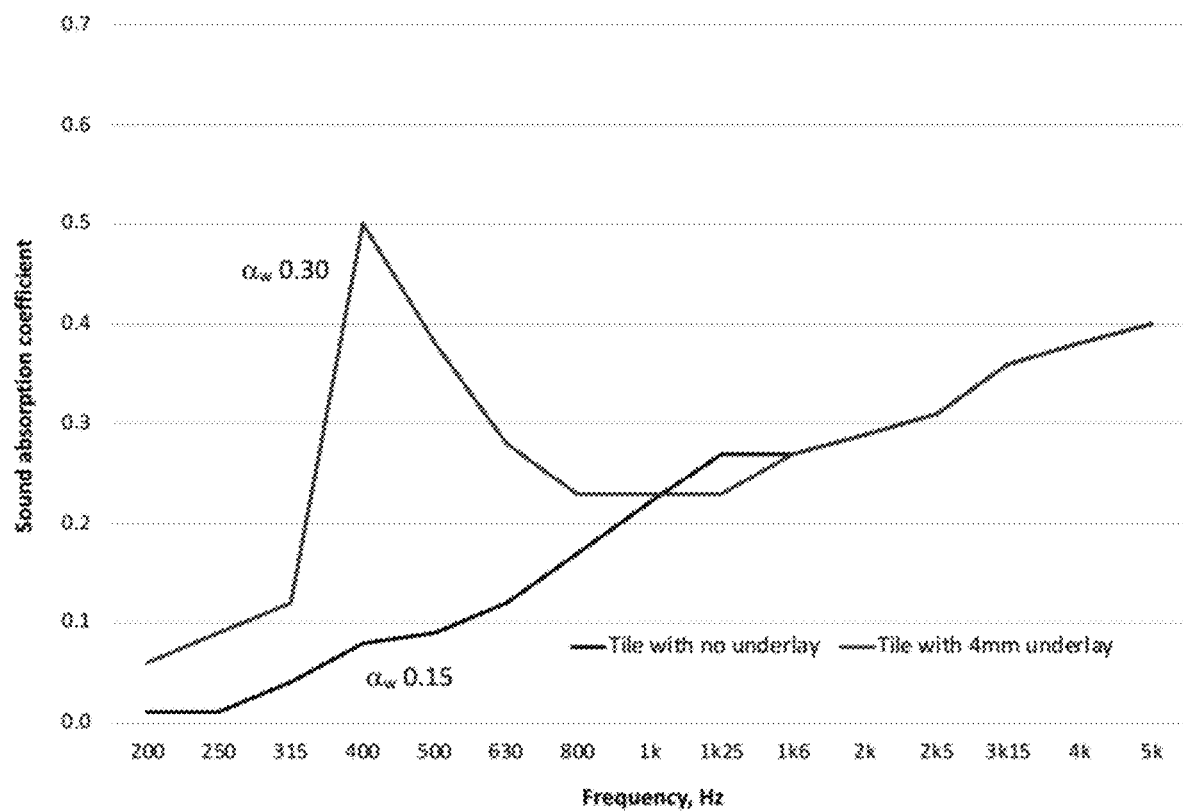
FIG. 3 is a plot showing sound absorption coefficients at various frequencies for a sound-absorbing article without perforations or underlay and the sound-absorbing article without perforations and having an underlay.

In various aspects, the sound-absorbing article 10 and the surface covering 110 can provide a high level of absorption that is spectrally balanced. That is, referring to FIGS. 3-5, it is contemplated that embodiments herein can provide sound absorption at desirable levels and at desirable frequencies. For example, ISO 11654 defines a curve that details preferred absorption coefficients at each frequency. It is contemplated that the perforation patterns can optionally be selected to tailor a sound-absorbing article to provide sound absorption that matches the ISO 11654 curve. It is contemplated that the backing material and thickness, pile height and material properties, and underlay thickness and material properties can affect the acoustic absorption characteristics. Accordingly, the perforation distribution can be tailored based on the other properties of the sound-absorbing article. In further aspects, it is contemplated that the pattern of perforations 18 can be configured to avoid intersection or overlap with specific areas of the backing where the face fibers pass through or are secured to the backing, thereby ensuring that the presence of the perforations does not have a negative effect on the tuft bind or other connection/association between the face fibers and the backing.

Accordingly, in various aspects, the article 10, or a surface covering 110 comprising a plurality of articles, can comprise a plurality of different areas that are configured to provide peak sound attenuation across different frequency ranges. In some aspects, the article 10, or a surface covering 110 comprising a plurality of articles, can comprise four different areas that are configured to provide peak sound attenuation across different frequency ranges. For example, the four different areas can comprise an area (a first one of the different areas) that has a peak sound attenuation between 400 Hz and 630 Hz, an area (a second one of the different areas) that has a peak sound attenuation between 630 Hz and 1000 Hz, an area (a third one of the different areas) that has a peak sound attenuation between 1000 Hz and 1600 Hz, and an area (a fourth one of the different areas) that has a peak sound attenuation between 1600 Hz and 2500 Hz. In further aspects, the article 10, or a surface covering 110 comprising a plurality of articles, can comprise five different areas that are configured to provide peak sound attenuation across different frequency ranges. For example, the five different areas can comprise an area (a first one of the different areas) that has a peak sound attenuation between 200 Hz and 315 Hz, an area (a second one of the different areas) that has a peak sound attenuation between 400 Hz and 630 Hz, an area (a third one of the different areas) that has a peak sound attenuation between 630 Hz and 1000 Hz, an area (a fourth one of the different areas) that has a peak sound attenuation between 1000 Hz and 1600 Hz, and an area (a fifth one of the different areas) that has a peak sound attenuation between 1600 Hz and 2500 Hz. It is contemplated that the perforations can be tailored based on the properties of the article(s) For example, varying the thickness of the backing, the material of the backing, inclusion or exclusion of different underlays, etc. can change the frequency ranges at which a particular perforation pattern with a given percent open provides peak sound attenuation. Thus, routine experimentation can be applied to determine a pattern (e.g., a percent open area) for providing peak sound attenuation at different frequencies. The percent open area can range, for example, from about 0.02% to about 5% for different areas of the backing.

In some aspects, a system 50 can comprise a sound-absorbing article 10 and a porous underlay material 52. Optionally, the porous underlay material 52 can have a thickness of at least 2 mm or at least 4 mm or about 4 mm. Optionally, the porous underlay material 52 can be integral to the sound-absorbing article 10. In some exemplary aspects, the porous underlay material 52 can comprise a shock absorbing pad, such as, for example, a composite nonwoven pad. In addition to (or instead of) the underlay material 52, it is contemplated that the system 50 can optionally comprise a cushioning material, a reinforcing layer, a scrim, or any combination thereof. Optionally, it is contemplated that the system 50 can define at least a portion of a surface covering (e.g., a floor covering) as disclosed herein.

Figure 8:
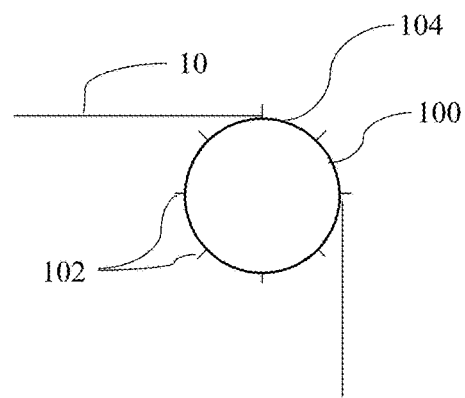
FIG. 8 illustrates an assembly for forming perforations in the backing of the article as disclosed herein.

In various aspects, the perforations in the backing can be formed in the sound-absorbing article. For example, referring to FIG. 8, during manufacturing, the article 10 can be drawn across a spiked roller 100 to form the perforations. For example, the spiked roller 100 can comprise a plurality of spikes 102 that extend from a roller surface 104.

Figure 9:
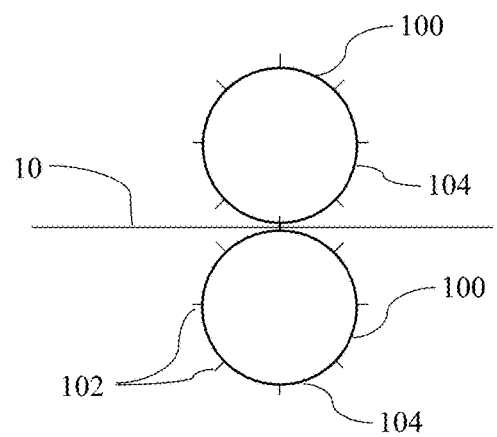
FIG. 9 illustrates an assembly for forming perforations in the backing of the article as disclosed herein.

In further aspects, and with reference to FIG. 9, the article 10 can be nipped between rollers, wherein at least one roller is a spiked roller 100. For example, one or both rollers can comprise a plurality of spikes 102 that extend from the roller surface. One or both of the rollers can define corresponding recesses that receive the spikes 102 of the opposed roller.

The plurality of spikes 102 can optionally have a taper away from the roller surface. In further aspects, the spikes can have a consistent circumferential dimension (e.g., diameter) along their dimension of extension away from the roller surface. The spikes 102 can be spaced along the roller surface 104 in order to form a desired perforation pattern, such those described herein. For example, the spikes 102 can optionally have even or uneven spacing along the length of the roller surface (perpendicular to the circumference of the roller surface). Still further, the spikes 102 can optionally have even or uneven spacing about the circumference of the roller surface. In some exemplary aspects, the spikes can, over a single revolution or partial revolution (e.g., ½ revolution, ⅓ revolution, ¼ revolution), form a pattern sequence through a backing as described herein.

Figure 10:
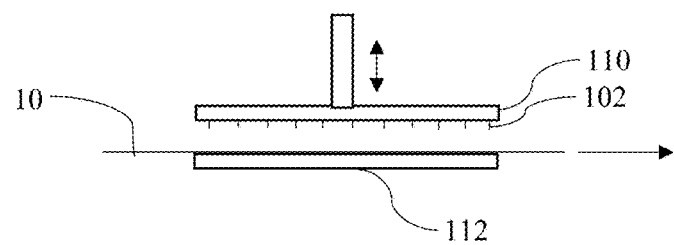
FIG. 10 illustrates an assembly for forming perforations in the backing of the article as disclosed herein.

In still further aspects, and referring to FIG. 10, a spiked press 110 comprising a plurality of spikes 102 can advance toward and away from (optionally, reciprocally advance toward and away from) the article 10 to form the perforations. In exemplary aspects, the spiked press 110 can press against a support surface 112 opposite the backing 12. The support surface 112 can define receptacles that are configured to receive the spikes of the spiked press. In some aspects, the article 10 can be drawn across the support surface 112 and then stopped as the spikes 102 of the spiked press 110 extend through the backing 10 to form the perforations. The article can then be moved a predetermined distance along the support surface (e.g., about the length of the spiked press) along the direction of movement of the article 10, then stopped, and then the spikes 102 of the spiked press 110 can again extend through (optionally, reciprocally extend through) the backing. The spikes 102 of the spiked press 110 can be spaced to form one or more patterns (e.g., one or more pattern sequences) as disclosed herein. Accordingly, the spikes 102 of the spiked press 110 can be evenly or unevenly spaced along the direction of movement of the article 10 or transverse to the movement of the article.

In still further aspects, either of the spiked roll(s) or the spiked press can comprise a plurality of heated needles that can penetrate and melt the backing 12 to form the perforations. Optionally, the spikes 102 can be lubricated. In further aspects, punches that are configured to remove portions (e.g., rectangular or round cutouts) of the article, instead of or in addition to spikes, can be used to form the perforations. It is contemplated that the perforations 18 can be formed at various stages of manufacturing. For example, the perforations 18 can be formed before or after face fibers have been coupled to the backing, before or during a process in which the material is formed into tiles, or as a subsequent process after cutting the material individual tiles.

It is contemplated that embodiments herein can be used to define at least a portion of floor coverings, wall or ceiling coverings, automobile surface coverings, or coverings or surfaces in any other environments in which sound absorption is desirable.

In exemplary aspects, when the sound-absorbing article 10 is used to define at least a portion of a floor covering, the sound-absorbing article can comprise a carpet, a modular tile (e.g., a carpet tile), an artificial turf section, a mat, a rug, and the like. In these aspects, it is contemplated that floor coverings formed at least in part by the sound-absorbing articles can comprise carpets, rugs, or artificial turf installations.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A sound-absorbing article comprising:
a backing having a thickness; and
face fibers associated with the backing,
wherein the backing defines a plurality of perforations that fully extend through the thickness of the backing and are patterned to determine an acoustic property of the sound-absorbing article, wherein, within at least a portion of the backing, sequential perforations of the plurality of perforations are spaced center-to-center by between 5 mm and 100 mm.

Aspect 2: The sound-absorbing article of aspect 1, wherein each perforation of the plurality of perforations has a diameter of between 0.5 mm and 2.5 mm.

Aspect 3: The sound-absorbing article of aspect 2, wherein each perforation of the plurality of perforations has a diameter of about 1 mm.

Aspect 4: The sound-absorbing article of any one of the preceding aspects, wherein the plurality of perforations comprise a first plurality of perforations that are arranged in a first pattern and a second plurality of perforations that are arranged in a second pattern that is different from the first pattern.

Aspect 5: The sound-absorbing article of aspect 4, wherein the first plurality of perforations are disposed over a first area, wherein the second plurality of perforations are disposed over a second area, wherein the first area is disposed within a perimeter defined by the second area such that the second area encloses the first area.

Aspect 6: The sound-absorbing article of any one of the preceding aspects, wherein the plurality of perforations further comprise a third plurality of perforations that are arranged in a third pattern.

Aspect 7: The sound-absorbing article of aspect 6, wherein the third plurality of perforations are disposed over a third area, wherein the second area is disposed within a perimeter defined by the third area such that the third area encloses the second area.

Aspect 8: The sound-absorbing article of aspect 6, wherein the third plurality of perforations are disposed over a third area, wherein the third area is disposed within a perimeter defined by the first area such that the first area encloses the third area.

Aspect 9: The sound-absorbing article of any one of aspects 4-8, wherein one of the first pattern or the second pattern comprises sequential perforations spaced center-to-center by between 8 mm and 12 mm, and wherein the other of the first pattern or the second pattern comprises sequential perforations spaced center-to-center by between 13 mm and 17 mm.

Aspect 10: The sound-absorbing article of any one of aspects 4-9, wherein one of the first pattern or the second pattern comprises a percent open area of between 0.6% and 0.8%, wherein the other of the first pattern or the second pattern comprises a percent open area of between 0.25% and 0.45%, wherein the percent open area of the first pattern corresponds to a percentage of the first area that is occupied by the first pattern of perforations, and wherein the percent open area of the second pattern corresponds to a percentage of the second area that is occupied by the second pattern of perforations.

Aspect 11: The sound-absorbing article of any one of aspects 6-10, wherein the third pattern comprises adjacent perforations spaced center-to-center by between 15 and 25 mm.

Aspect 12: The sound-absorbing article of any one of aspects 6-8, wherein the third pattern comprises a percent open area of between 0.15% and 0.25%.

Aspect 13: The sound-absorbing article of any one of the preceding aspects, wherein the plurality of perforations are arranged in a rectangular grid or a triangular grid.

Aspect 14: The sound-absorbing article of aspect 1, wherein each perforation of the plurality of perforations has a diameter of between 0.5 mm and 2.5 mm.

Aspect 15: The sound-absorbing article of any one of the preceding aspects, further comprising an area devoid of perforations, wherein the area devoid of perforations comprises a square area having dimensions of at least 50 mm by at least 50 mm.

Aspect 16: The sound-absorbing article of aspect 15, wherein the area devoid of perforations is disposed within a perimeter defined by the third area.

Aspect 17: The sound-absorbing article of aspect 4, wherein the first plurality of perforations are disposed over a first area, wherein the second plurality of perforations are disposed over a second area, wherein the first area is adjacent the second area.

Aspect 18: The sound-absorbing article of aspect 17, wherein the plurality of perforations further comprise a third plurality of perforations that are arranged in a third pattern, wherein the third plurality of perforations are disposed over a third area, wherein the third area is adjacent at least one of the first area and the second area.

Aspect 19: The sound-absorbing article of any one of the preceding aspects, wherein the unperforated portion is configured to define a peak sound absorption between 315 Hz and 500 Hz.

Aspect 20: The sound-absorbing article of any one of the preceding aspects, wherein at least a portion of the plurality of perforations are configured to define a peak sound absorption between 600 and 1000 kHz.

Aspect 21: The sound-absorbing article of any one of the preceding aspects, wherein at least a portion of the plurality of perforations are configured to define a peak sound absorption between 1 kHz and 1.6 kHz.

Aspect 22: The sound-absorbing article of any one of the preceding aspects, wherein at least a portion of the plurality of perforations are configured to define a peak sound absorption between 1.6 kHz and 2.5 kHz.

Aspect 23: The sound-absorbing article of any one of the preceding aspects wherein at least a portion of the plurality of perforations are configured to define a peak sound absorption between 200 Hz and 315 Hz.

Aspect 24: The sound-absorbing article of any one of the preceding aspects, wherein the face fibers comprise a plurality of tufts that extend through the backing.

Aspect 25: The sound-absorbing article of any one of the preceding aspects, wherein the sound-absorbing article comprises a carpet or a carpet tile.

Aspect 26: A system comprising:
a sound-absorbing article as in any one of the preceding aspects; and
an underlay material.

Aspect 27: The system of aspect 26, wherein the underlay material is a porous underlay having a thickness of at least 2 mm.

Aspect 28: The system of aspect 27, wherein the underlay material is a porous underlay having a thickness of at least 4 mm.

Aspect 29: The system of any one of aspects 26-28, wherein the porous underlay is integral to the sound-absorbing article.

Aspect 30: A method comprising:
forming, in an article comprising a backing having a thickness and face fibers associated with the backing, a plurality of perforations that fully extend through the thickness of the backing, wherein the plurality of perforations are patterned to determine an acoustic property of the article, wherein, within at least a portion of the backing, sequential perforations of the plurality of perforations are spaced center-to-center by between 5 mm and 100 mm.

Aspect 31: The method of aspect 30, wherein forming the plurality of perforations comprises drawing the backing across a roller, wherein the roller comprises an outer surface and a plurality of spikes extending from the outer surface.

Aspect 32: The method of aspect 30, wherein forming the plurality of perforations comprises nipping the backing between a pair of rollers, wherein at least one roller of the pair of rollers comprises an outer surface and a plurality of spikes extending from the outer surface.

Aspect 33: The method of aspect 30, wherein forming the plurality of perforations comprises driving spikes of a spiked press through the backing.

Aspect 34: The method of any one of aspects 31-33, wherein the plurality of spikes comprise heated needles that melt the backing.

Aspect 35: A floor covering comprising:
at least one article comprising:
a backing having a thickness; and
face fibers associated with the backing,
wherein the backing defines a plurality of perforations that fully extend through the thickness of the backing and are patterned to determine an acoustic property of the floor covering,
wherein, within at least a portion of the backing, sequential perforations of the plurality of perforations are spaced center-to-center by between 5 mm and 100 mm.

Aspect 36: The floor covering of aspect 35, wherein the at least one article comprises a plurality of articles, wherein a first article of the plurality of articles comprises a first plurality of perforations that are arranged in a first pattern, wherein the first plurality of perforations are disposed over a first area, wherein a second article of the plurality of articles comprises a second plurality of perforations that are arranged in a second pattern, wherein the second plurality of perforations are disposed over a second area, wherein the first pattern defines a first open area, wherein the second pattern defines a second open area, and wherein the first open area is greater than the first open area.

Aspect 37: The floor covering of aspect 36, wherein the first article has a surface area, wherein the first area covers an entirety of the surface area of the first article, wherein the second article has a surface area, wherein the second area covers an entirety of the surface area of the second article.

Aspect 38: The floor covering of aspect 36, wherein at least one of the first article or the second article comprises a third plurality of perforations that are arranged in a third pattern, wherein the third plurality of perforations are disposed over a third area.

Aspect 39: The floor covering of any one of aspects 35-37, wherein the first and second articles are arranged so that the first area is adjacent to the second area.

Aspect 40: The floor covering of any one of aspects 35-38, wherein at least one article of the plurality of articles comprises an area devoid of perforations, wherein the area devoid of perforations comprises a square area having dimensions of at least 50 mm by at least 50 mm.

Aspect 41: A method comprising:
positioning a plurality of flooring articles to define a floor covering, wherein the plurality of flooring articles comprise at least one sound-absorbing article, the sound-absorbing article comprising:
a backing having a thickness; and
face fibers associated with the backing,
wherein the backing defines a plurality of perforations that fully extend through the thickness of the backing,
wherein, within at least a portion of the backing, sequential perforations of the plurality of perforations are spaced center-to-center by between 5 mm and 100 mm, and
wherein the plurality of perforations of the at least one sound-absorbing article are patterned and positioned to determine an acoustic property of the floor covering.

Aspect 42: A method comprising:
positioning a plurality of flooring articles to define a floor covering, wherein at least one flooring article of the plurality of flooring articles comprises a sound-absorbing article as in any one of claims 1-25.

Aspect 43: The method of aspect 42, wherein the at least one flooring article of the plurality of flooring articles comprises:
a backing having a thickness; and
face fibers associated with the backing,
wherein the backing has a square area of 100 mm by 100 mm that does not comprise perforations.

Aspect 44: The method of aspect 42 or aspect 43, wherein the plurality of flooring articles further comprises an article having:
a backing having a thickness; and
face fibers associated with the backing,
wherein the backing does not comprise perforations.

Although the foregoing invention has been described in some detail by way of illustration and example for purposes of clarity of understanding, certain changes and modifications may be practiced within the scope of the appended claims.

What is claimed is:

1. A sound-absorbing article comprising:
a backing having a thickness, the backing configured to receive face fibers that extend therefrom,
wherein the backing defines a plurality of perforations that fully extend through the thickness of the backing and are patterned to determine an acoustic property of the sound absorbing article,
wherein the plurality of perforations comprise:
a first plurality of perforations that are arranged in a first pattern,
a second plurality of perforations that are arranged in a second pattern that is different from the first pattern, and
a third plurality of perforations that are arranged in a third pattern,
wherein the first plurality of perforations are disposed over a first area, wherein the second plurality of perforations are disposed over a second area, wherein the first area is disposed within a perimeter defined by the second area such that the second area encloses the first area,
wherein the third plurality of perforations are disposed over a third area,
wherein the second area is disposed within a perimeter defined by the third area such that the third area encloses the second area,
wherein, within at least a portion of the backing, sequential perforations of the plurality of perforations are spaced center-to-center by between 5 mm and 100 mm.

2. The sound-absorbing article of claim 1, wherein each perforation of the plurality of perforations has a diameter of between 0.5 mm and 2.5 mm.

3. The sound-absorbing article of claim 2, wherein each perforation of the plurality of perforations has a diameter of about 1 mm.

4. The sound-absorbing article of claim 1, further comprising an area devoid of perforations, wherein the area devoid of perforations is disposed within a perimeter defined by the third area.

5. The sound-absorbing article of claim 1, wherein at least a portion of the plurality of perforations are configured to define a peak sound absorption between 600 and 1000 kHz.

6. The sound-absorbing article of claim 1, wherein at least a portion of the plurality of perforations are configured to define a peak sound absorption between 1 kHz and 1.6 kHz.

7. The sound-absorbing article of claim 1, wherein at least a portion of the plurality of perforations are configured to define a peak sound absorption between 1.6 kHz and 2.5 kHz.

8. The sound-absorbing article of claim 1, wherein the backing is configured for use in a floor covering.

9. A sound-absorbing article comprising:
a backing having a thickness; and
face fibers associated with the backing and extending therefrom,
wherein the backing defines a plurality of perforations that fully extend through the thickness of the backing and are patterned to determine an acoustic property of the sound-absorbing article,
wherein the plurality of perforations comprise:
a first plurality of perforations that are arranged in a first pattern,
a second plurality of perforations that are arranged in a second pattern that is different from the first pattern, and
wherein the first plurality of perforations are disposed over a first area,
wherein the second plurality of perforations are disposed over a second area,
wherein the first area is disposed within a perimeter defined by the second area such that the second area encloses the first area,
wherein, within at least a portion of the backing, sequential perforations of the plurality of perforations are spaced center-to-center by between 5 mm and 100 mm.

10. The sound-absorbing article of claim 9, wherein each perforation of the plurality of perforations has a diameter of between 0.5 mm and 2.5 mm.

11. The sound-absorbing article of claim 10, wherein each perforation of the plurality of perforations has a diameter of about 1 mm.

12. The sound-absorbing article of claim 9, further comprising an area devoid of perforations, wherein the area devoid of perforations is disposed within a perimeter defined by the third area.

13. The sound-absorbing article of claim 9, wherein at least a portion of the plurality of perforations are configured to define a peak sound absorption between 600 and 1000 kHz.

14. The sound-absorbing article of claim 9, wherein at least a portion of the plurality of perforations are configured to define a peak sound absorption between 1 kHz and 1.6 kHz.

15. The sound-absorbing article of claim 9, wherein at least a portion of the plurality of perforations are configured to define a peak sound absorption between 1.6 kHz and 2.5 kHz.

16. The sound-absorbing article of claim 9, wherein at least a portion of the plurality of perforations are configured to define a peak sound absorption between 200 Hz and 315 Hz.

17. The sound-absorbing article of claim 9, wherein the face fibers are tufted through the backing.

18. A sound-absorbing article comprising:
a backing having a thickness and configured to have face fibers extending therefrom,
wherein the backing defines a plurality of perforations that fully extend through the thickness of the backing and are patterned to determine an acoustic property of the sound absorbing article,
wherein the plurality of perforations comprise:
a first plurality of perforations that are arranged in a first pattern,
a second plurality of perforations that are arranged in a second pattern that is different from the first pattern, and
wherein the first plurality of perforations are disposed over a first area,
wherein the second plurality of perforations are disposed over a second area,
wherein the first area is disposed within a perimeter defined by the second area such that the second area encloses the first area,
wherein, within at least a portion of the backing, sequential perforations of the plurality of perforations are spaced center-to-center by between 5 mm and 100 mm.

19. The sound-absorbing article of claim 18, wherein each perforation of the plurality of perforations has a diameter of between 0.5 mm and 2.5 mm.

20. The sound-absorbing article of claim 18, wherein each perforation of the plurality of perforations has a diameter of about 1 mm.

21. The sound-absorbing article of claim 18, further comprising an area devoid of perforations, wherein the area devoid of perforations is disposed within a perimeter defined by the third area.

22. The sound-absorbing article of claim 18, wherein at least a portion of the plurality of perforations are configured to define a peak sound absorption between 600 and 1000 kHz.

23. The sound-absorbing article of claim 18, wherein at least a portion of the plurality of perforations are configured to define a peak sound absorption between 1 kHz and 1.6 kHz.

24. The sound-absorbing article of claim 18, wherein at least a portion of the plurality of perforations are configured to define a peak sound absorption between 1.6 kHz and 2.5 kHz.

25. The sound-absorbing article of claim 18, wherein at least a portion of the plurality of perforations are configured to define a peak sound absorption between 200 Hz and 315 Hz.

26. A floor covering comprising:
at least one article comprising:
a backing having a thickness, the backing configured to have face fibers extending therefrom, wherein the backing defines a plurality of perforations that fully extend through the thickness of the backing and are patterned to determine an acoustic property of the floor covering, wherein, within at least a portion of the backing, sequential perforations of the plurality of perforations are spaced center-to-center by between 5 mm and 100 mm, wherein the at least one article comprises a plurality of articles, wherein a first article of the plurality of articles comprises a first plurality of perforations that are arranged in a first pattern, wherein the first plurality of perforations are disposed over a first area, wherein a second article of the plurality of articles comprises a second plurality of perforations that are arranged in a second pattern, wherein the second plurality of perforations are disposed over a second area, wherein the first pattern defines a first percent open area, wherein the second pattern defines a second percent open area, and wherein the first percent open area is greater than the second percent open area.

27. The floor covering of claim 26, wherein the first and second articles are arranged so that the first area is adjacent to the second area, and wherein the first plurality of perforations and the second plurality of perforations comprise perforations formed using spikes of a spiked press rolled through the backing, wherein said spikes comprises heated needles that melt the backing.

28. The floor covering of claim 26, wherein at least one article of the plurality of articles comprises an area devoid of perforations, wherein the area devoid of perforations comprises a square area having dimensions of at least 50 mm by at least 50 mm.

* * * * *